Aug. 18, 1925.

F. P. VOGEL 1,550,474

FRIT KILN

Filed April 16, 1925   3 Sheets-Sheet 3

Inventor
Frank P. Vogel

By  J. K. Bryant
Attorney.

Patented Aug. 18, 1925.

1,550,474

UNITED STATES PATENT OFFICE.

FRANK P. VOGEL, OF ZANESVILLE, OHIO.

FRIT KILN.

Application filed April 16, 1925. Serial No. 23,557.

*To all whom it may concern:*

Be it known that I, FRANK P. VOGEL, a citizen of the United States of America, residing at Zanesville, in the county of Muskingum and State of Ohio, have invented certain new and useful Improvements in Frit Kilns, of which the following is a specification.

This invention relates to improvements in frit kilns.

The primary object of the invention is the provision of a kiln suitable for being easily and quickly charged with the materials to be fritted or vitrified and to subject said materials, while lying upon the bottom or bridge of the kiln, to a suitable temperature for forming molten frit which will be conveyed by gravity to a pan of water where the frit is collected; the frit, while traveling from the bridge to the water pan, being kept at a molten temperature to prevent cooling and collecting in a ball at the discharge point of the kiln.

A further object of the invention is to provide an improved form of bottom or bridge for a frit kiln which will more readily withstand the destructive forces present in such an apparatus.

A still further object of the invention is the forming of a frit kiln with removable wall sections or plates which will permit kiln repairs to be made more rapidly and at much less expense.

Other objects and advantages of the invention which will become apparent to those skilled in the art as the description proceeds are the decided saving in fuel, labor, and time; the reducing of the liability of injury to operators; and the producing of more and a better grade of finished frit in less time.

Figure 1:
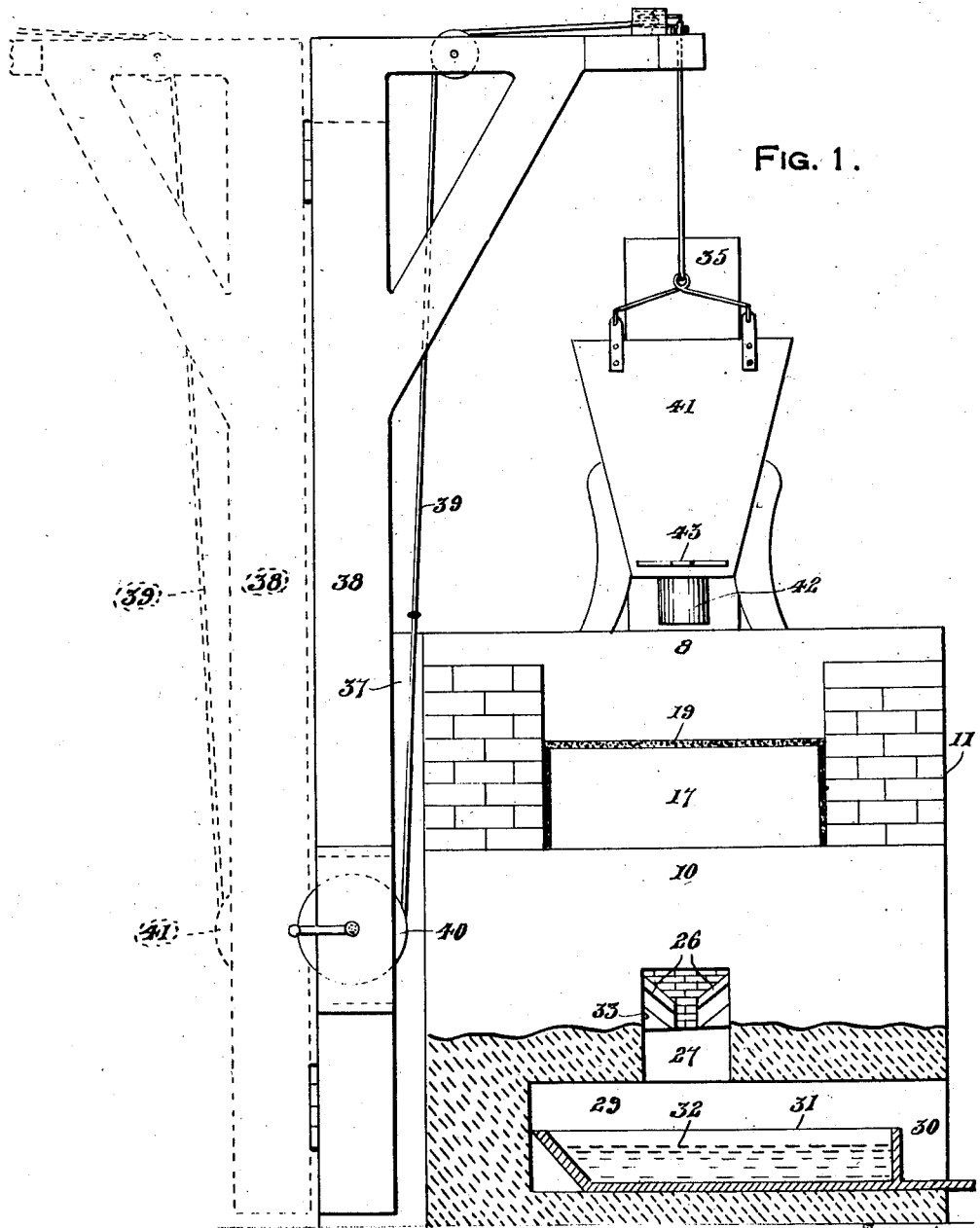
Figure 2:
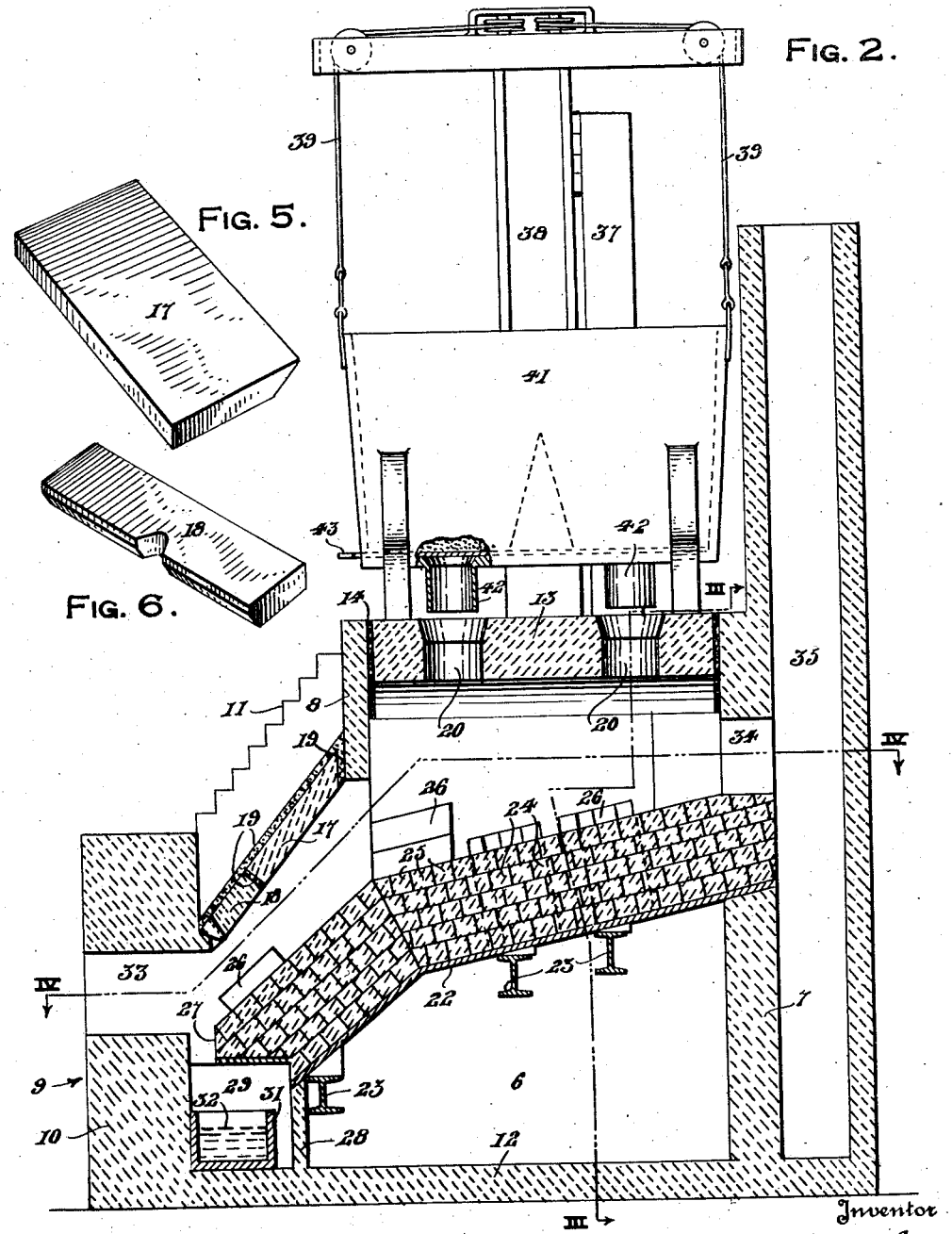
Figure 3:
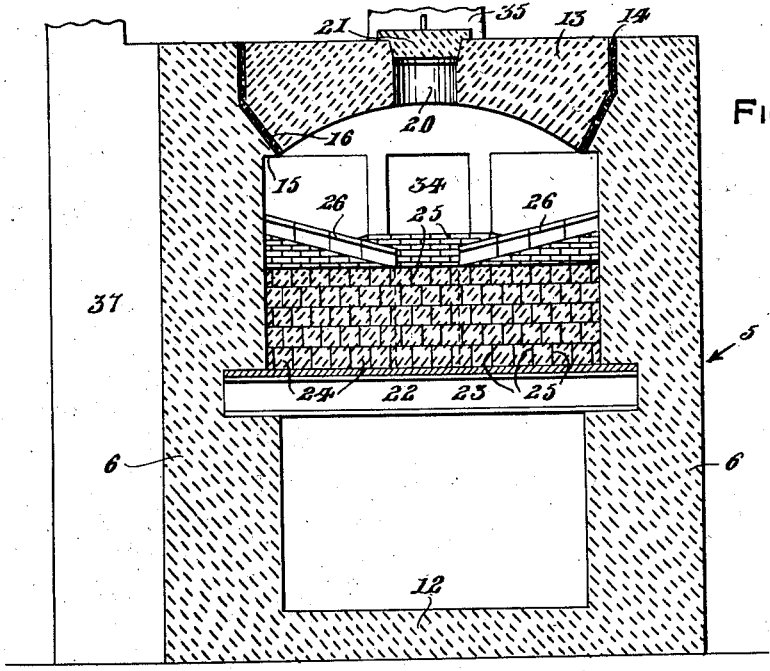
Figure 4:
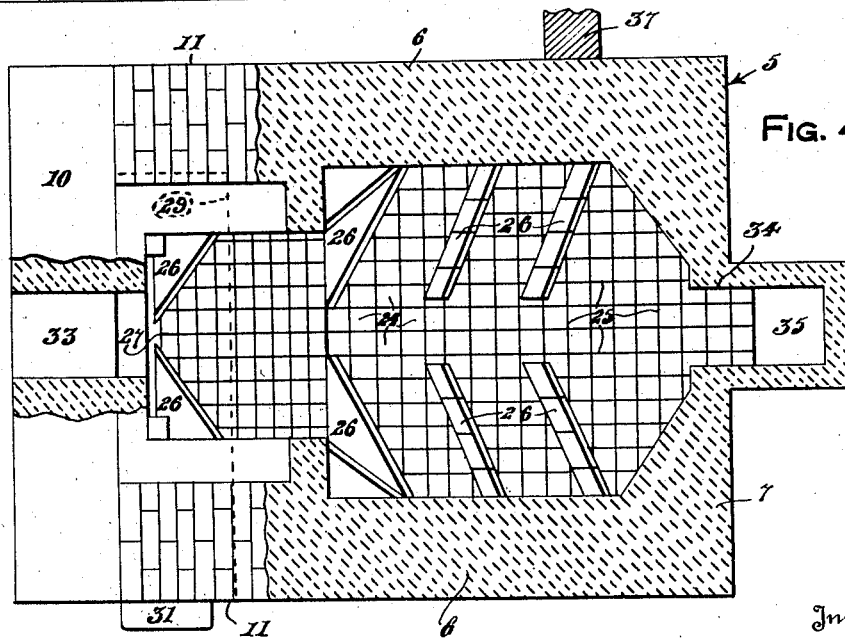

In the accompanying drawings forming a part of this specification and in which like numerals are employed to designate like parts throughout the same, Figure 1 is a front elevational view, partly broken away, of the frit kiln embodying this invention with a kiln charging apparatus associated therewith, Figure 2 is a vertical sectional view of the structure shown in Fig. 1, Figure 3 is a vertical sectional view taken upon line III—III of Fig. 2, Figure 4 is a horizontal sectional view taken upon lines IV—IV of Fig. 2, Figure 5 is a detail perspective view of a removable plate which forms a part of the removable top of the throat portion of the kiln, and Figure 6 is a perspective view of a second plate which cooperates with the plate shown in Fig. 5.

In the drawings, wherein for the purpose of illustration is shown a preferred embodiment of this invention, the numeral 5 designates the main body portion of the kiln which is formed of side walls 6 and a rear wall 7 of substantially equal height. The front of the kiln is partially closed at its upper portion by the front wall section 8, best shown in Figs. 1 and 2.

The kiln is further formed with a throat portion designated in its entirety by the reference numeral 9 and which projects forwardly of the open portion of the front of the main body 5. This throat portion includes a front wall 10 which terminates at its upper edge below the lower edge of the front wall section 8. The side walls 11 of the throat portion are formed as continuations of the side walls 6 of the main body portion.

The bottom wall or base 12 is common to both the main body portion 5 and the throat portion 9. The top of the main body portion is closed by the removable plate or cover 13 which is sealed at its sides by the packing material 14 and is prevented from falling into the interior of the kiln by the sloping walls 15 and 16, see Fig. 3. The top of the throat portion 9 is closed by the removable plates 17 and 18, shown in detail in Figs. 5 and 6 and assembled in Fig. 2. These removable plates 17 and 18 are sealed by the packing material 19 which is placed around all four sides of each plate and covers the top of the same.

The removable plate or cover 13 is illustrated in Figs. 2 and 3 as being formed with the material receiving openings 20 which are to be closed during firing by the removable plugs 21, see Fig. 3.

As a suggestion of the materials from which the various parts so far referred to may be formed, it might be said that the various walls of the main body portion 5 and throat portion 9 may be constructed of heavy fire brick properly tied or bolted together from end to end or side to side, in any of the many ways known in the art, to take care of expansion and contraction. The removable plate or cover 13 is preferably formed of the type of clay commonly used in all factories producing glazed clay products, The removable plates 17 and 18, also, should be formed of such material. The packing 14 for sealing the clay plate or cover 13 can be in the form of sheet asbestos which will prevent sticking of the said member. The packing material 19, employed for sealing the removable plates 17 and 18 in place, may be a suitable fire clay mortar, or the like. The removable plugs 21 employed for closing the material receiving openings 20 may be formed of the type of clay referred to in connection with the plates 13, 17, and 18.

The main body portion 5 and throat portion 9 are intended to have formed therein a bottom or bridge which includes any suitable type of platform, such as the platform 22 supported by the transversely extending I-beams 23. Mounted upon this platform 22 are the five layers of floor tile 24 which are preferably about six inches square. The joints 25 between the tile of each layer are arranged to overlie the middle portion of the tile of the layer immediately therebelow, as clearly illustrated in Figs. 2 and 3. It has been found, after many experiments in operating kilns having differently constructed bottoms or bridges, that the best result possible is brought about by the construction just referred to and that these five layers of overlapping floor tile will materially prevent the frit from cutting through the bottom or bridge. Actual tests with this type of bottom or bridge prove that this construction will withstand the destructive forces present in a frit kiln for about three weeks steady running; the types of bottoms or bridges now in common use only being suitable for withstanding the destructive forces produced by continuous running for about two or three days.

It will be noted, by inspecting Fig. 2, that the portion of the bottom or bridge extending through the main body portion 5 of the kiln extends on a slight incline while the portion of the bottom or bridge located in the throat portion of the kiln extends on a greater incline. The bottom or bridge is shown in the various figures as having a plurality of downwardly converging pairs of stays 26 which are formed of a plurality of bricks built upon each other and extending from the platform entirely through the bridge to project above the latter for forming a molten frit flow path which extends longitudinally of the bridge. It will be noted, by inspecting Figs. 2 and 4, that the lower end 27 of the bottom or bridge terminates in spaced relation with the front wall 10 of the throat portion of the kiln. This space forms a molten frit discharge.

A vertical wall section 28 is formed in the throat portion 9 of the kiln and extends from the bottom wall or base 12 to the platform 22. This wall 28 forms a pocket 29 having an opening 30 through the side wall 11 of the throat portion and is intended to receive a pan or receptacle 31 having a liquid, such as water, 32 placed therein. It will be seen that this water pan 31 is arranged immediately below the molten frit discharge space or opening formed by the end 27 of the bottom or bridge and the front wall 10 of the throat portion.

The front wall 10 of the throat portion 9 is formed with an entrance 33 through which the heat for the kiln is intended to pass. It is to be understood that this entrance may vary in size and shape to conform to the method of heating which can be either natural or artificial gas, coal, or oil, depending upon the facilities of the factory using the kiln. The rear wall 7 of the main body portion 5 of the kiln is provided with a heat exit 34 which communicates with a stack 35 extending upwardly above the top of the kiln in the manner illustrated. It will now be seen that the heat in passing from the entrance 33 to the exit 34 will travel upwardly through the heat chamber 36 formed above the bottom or bridge and will come in contact with the material to be fritted or vitrified and the molten frit as it flows downwardly along the top of the bottom or bridge toward the receiving pan 31.

To permit rapid and easy charging of the kiln, an upright 37 is arranged at one side of the kiln and has pivotally fastened thereto a crane 38 having a tackle structure 39 operable by means of the pulley 40. This tackle 39 has fastened to its outer ends the hopper 41 which is provided with the discharge nozzles 42 having their bores selectively opened and closed by the sliding valve 43. This hopper 41, after being filled with the materials to be fritted or vitrified, is hoisted to the level of the top of the kiln and the crane 38 is then swung around to locate the hopper above the main body portion 5 with its discharge nozzles 42 in alinement with the material receiving openings 20 of the kiln. The plugs 21 are, of course, removed and by withdrawing the valve plate 43, the materials in the hopper may be discharged into the kiln.

The operation of this frit kiln may be described as follows:—

The heating oven is first brought to a proper temperature by the passing of heat from the entrance 33 through the chamber to the exit 34. After the kiln has been properly heated, the main body portion is charged with a suitable amount of materials to be frited. These materials are deposited upon the bottom or bridge within the main body portion where they will rest and will be subjected to the intense heat passing through the chamber 36. These materials will be heated until they melt when they will flow along the inclined bridge in a molten stream. This molten frit will be subjected to intense heat during its entire travel along the bridge and will still be in a molten state when discharged from the chamber 36 into the pan 31. The stays 26 are for the purpose of preventing the frit from running into a body and for causing the molten frit to travel along the center of the bridge.

It is now believed that the method of constructing and manner of operating this frit kiln will be understood from the above detail description and that no further explanation is deemed necessary. It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. In a device of the type described, a kiln, an inclined bridge arranged in said kiln to form a heating chamber thereabove, a heat entrance leading into the chamber at the lower end of the bridge, a heat exit leading from the chamber at the higher end of the bridge, said chamber having an entrance for the material to be fritted formed in the top wall of the kiln above the upper portion of the bridge, the bridge having its lower end terminating in spaced relation with the adjacent wall of the kiln to form a molten frit discharge, a plurality of downwardly converging pairs of stays projecting above said bridge and forming a molten frit flow path extending longitudinally of the bridge, and a liquid carrying pan below said discharge to receive the molten frit.

2. In a device of the type described, a kiln, an inclined platform formed in said kiln, a bridge mounted on said platform, said bridge consisting of a multiplicity of layers of tile with the tile in each layer breaking the joints between the tile of the layer immediately therebelow, and a plurality of downwardly converging pairs of stays projecting above said bridge, said stays each being formed of a plurality of bricks built up through the bridge from the platform.

3. In a device of the type described, a kiln comprising a main body portion having side and rear walls of equal height, and a front wall section closing the upper part of the front of the body portion, a throat portion projecting forwardly of the front of the body, said throat consisting of a front wall having its top terminating below the lower edge of the front wall section, and side walls formed as continuations of the side walls of the body portion; a removable top for the body portion, a removable top for the throat portion extending on an incline from the front wall of the throat to the front wall section of the body portion, and a bridge formed in said body and throat portions which may be easily reached for repairs by removing said tops.

4. In a device of the type described, a kiln comprising a main body portion having side and rear walls of equal height, and a front wall section closing the upper part of the front of the body portion, a throat portion projecting forwardly of the front of the body, said throat consisting of a front wall having its top terminating below the lower edge of the front wall section, and side walls formed as continuations of the side walls of the body portion; a removable top for the body portion, a removable top for the throat portion extending on an incline from the front wall of the throat to the front wall section of the body portion, and a bridge extending through said body and throat portions and terminating in spaced relation with the front wall of the throat portion, the portion of the bridge located within the body portion being slightly inclined and the portion within the throat being inclined to a greater degree.

In testimony whereof I affix my signature.

FRANK P. VOGEL.